US009703371B1

(12) United States Patent
Yao et al.

(10) Patent No.: US 9,703,371 B1
(45) Date of Patent: Jul. 11, 2017

(54) OBTAINING INPUT FROM A VIRTUAL USER INTERFACE

(71) Applicant: Amazon Technologies, Inc., Seattle, WA (US)

(72) Inventors: Ning Yao, Cupertino, CA (US); Samuel Henry Chang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/753,745

(22) Filed: Jun. 29, 2015

Related U.S. Application Data

(63) Continuation of application No. 13/794,296, filed on Mar. 11, 2013, now Pat. No. 9,081,418.

(51) Int. Cl.
G06F 3/01 (2006.01)
G06F 3/03 (2006.01)

(52) U.S. Cl.
CPC ............ *G06F 3/011* (2013.01); *G06F 3/017* (2013.01); *G06F 3/0304* (2013.01)

(58) Field of Classification Search
CPC ................. G06F 3/0304; G06F 3/017; G06F 2203/04101; H04N 5/4403; H04N 21/485; G06K 9/00355
See application file for complete search history.

(56) References Cited

U.S. PATENT DOCUMENTS

| 4,654,872 A * | 3/1987 | Hisano .................... G06K 9/209 250/558 |
| 6,222,523 B1 * | 4/2001 | Harvill .................... G06F 3/011 345/156 |
| 7,418,392 B1 | 8/2008 | Mozer et al. |
| 7,720,683 B1 | 5/2010 | Vermeulen et al. |
| 7,774,204 B2 | 8/2010 | Mozer et al. |
| 7,810,050 B2 | 10/2010 | Hirai et al. |
| 2007/0126743 A1 * | 6/2007 | Park ........................ G06F 3/011 345/474 |
| 2012/0223885 A1 | 9/2012 | Perez |
| 2014/0240293 A1 * | 8/2014 | McCaughan ......... G06F 3/0304 345/175 |

FOREIGN PATENT DOCUMENTS

WO    WO2011088053 A2    7/2011

OTHER PUBLICATIONS

Office action for U.S. Appl. 13/794,296, mailed on Oct. 1, 2014, Yao et al., "Obtaining Input From a Virtual User Interface", 7 pages.
Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Abbas Abdulselam
(74) *Attorney, Agent, or Firm* — Lee & Hayes, PLLC

(57) ABSTRACT

A virtual user interface in a 3D environment is projected onto a display object, such as an open hand. An operating object, such as a stylus or a second hand with an index finger extended, may be used to select input features of the projected user interface. In one scenario, for example, a telephone keypad may be projected onto the open hand and the index finger may be used to select a particular number on the keypad. Images of the hands may be segmented to produce contours of the finger and open hand, and these contours are used to determine the location of the finger relative to the open hand.

20 Claims, 9 Drawing Sheets

OBTAINING INPUT FROM A VIRTUAL USER INTERFACE

CROSS-REFERENCE TO RELATED APPLICATION(S)

This application is a continuation of U.S. application Ser. No. 13/794,296, filed on Mar. 11, 2013 and entitled "Obtaining Input From A Virtual User Interface," the entirety of which is incorporated herein by this reference thereto.

BACKGROUND

User interfaces have traditionally relied on input devices such as keyboards, which require physical manipulation by a user. Increasingly, however, it is desired to detect and monitor the physical positions and movements of users within a scene or environment. User motions and gestures can be used in some environments as user commands and inputs to automated systems.

One challenge with utilizing user motions and gestures as inputs to automated systems can be identifying a location of a portion of an input device that is covering a part of the user interface. Accordingly, there is a need to improve ways to determine the location of input devices within a scene or environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 also illustrates respective 1D curvature information corresponding to the contours of the operating object.

FIG. 8 also illustrates 1D curvature information of the merged contour.

DETAILED DESCRIPTION

Figure 1:
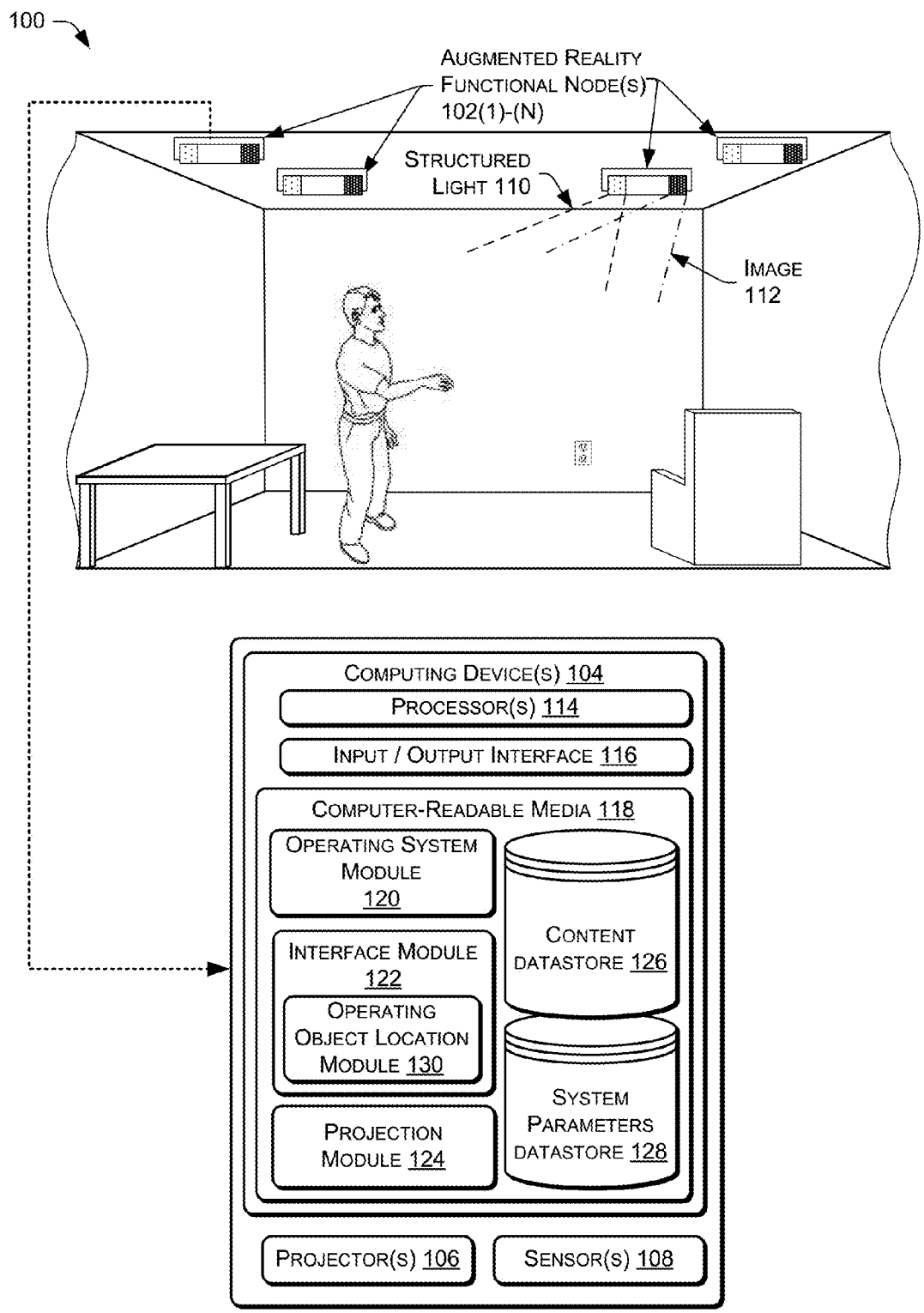
FIG. 1 illustrates an environment that includes an augmented reality functional node (ARFN) and a user that may interact with the ARFN using hand gestures.

Described herein are systems and techniques for obtaining input from a virtual user interface. In one implementation, the user interface is projected onto a display object, such as a hand. An operating object may be used to select input features of the user interface. In some cases, the operating object may include a hand and an input portion of the operating object, such as an index finger, may be used to indicate the selection of particular input features of the user interface.

In one implementation, a series of 3-Dimensional (3D) images of a scene or environment may be obtained via one or more sensors, such as cameras, over time. One or more of the 3D images may include the display object and the operating object. In some instances, data from the 3D images may be analyzed to determine a location of the input portion of the operating object with respect to input features of the user interface. In some cases, 2-Dimensional (2D) contours of the display object and the operating object may be generated from the 3D images and used to identify the input features of the user interface being selected via the input portion of the operating object.

In one scenario, as the input portion of the operating object begins to cover a portion of the display object, the 2D contours of the operating object and the display object may merge to form a merged contour. The merged contour may not include all of the contours of the display object or all of the contours of the operating object. For example, as an index finger of a hand, which is being used as an operating object, covers a portion of the display object, the portion of the index finger covering the display object is not included in the merged contour. Thus, a location of a portion of the operating object that is not reflected in the merged contour may be estimated in order to determine a particular input feature being selected by the input portion of the operating object.

In a particular implementation, the location of the portion of the operating object that is not reflected in the merged contour may be determined using 1-Dimensional (1D) curvature information generated from the 2D contours of the display object, the 2D contours of the operating object, and the merged contour. 1D curvature information may be obtained from the 2D contours using a predefined translation function. To illustrate, 1D curvature information for the display object and the operating object may be obtained before any portion of the operating object is covering a portion of the display object. In this way, 1D curvature information may be obtained for the complete 2D contours of the display object and the operating object. Additionally, 1D curvature information may be obtained for the merged contour after a portion of the operating object covers a portion of the display object. In an illustrative implementation, the 1D information of the separated display object and operating object may be compared to the 1D information of the merged contour to estimate a location of the portion of the operating object that is covering the display object. In some cases, 2D information, 3D information, or both of the operating objects may also be utilized to estimate the location of the portion of the operating object that is covering the display object. After estimating the location of the portion of the operating object covering a portion of the display object, an input feature being selected via the operating object may be determined.

Various types of cameras and sensors may be used to capture images representing the scene and a person's hand within the scene. In some instances, the described techniques may utilize the structured light techniques described in detail in pending U.S. patent application Ser. No. 12/977,924, filed on Dec. 23, 2010 and entitled "Characterization of a Scene with Structured Light", which is incorporated in its entirety herein by reference.

Example Environment

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user within the environment 100 may request that the ARFN 102 project a particular electronic book that the user wishes to read. In response, the ARFN 102 may project the book onto a projection surface within the environment 100. In another example, the user may request that the ARFN 102 project a particular movie or show that the user wishes to watch. In response, the ARFN 102 may obtain the content (locally or remotely) and may project the content onto a surface in the environment 100. In yet another example, the ARFN 102 may be configured to project a user interface (UI), such as a keyboard, a slider bar, a virtual remote control to operate a television within the environment 100, a telephone keypad, or any other type of UI. In some cases, the ARFN 102 may project the UI onto a display object in the environment 100, such as a hand of the user.

As discussed in further detail below, the ARFN 102 may include one or more sensor(s) 108 that may obtain data from the environment 100. In some implementations, the sensors 108 may include cameras (e.g., motion and/or still cameras), audio sensors (e.g., microphones), ultrasound transducers, heat sensors, motion detectors (e.g., infrared imaging devices), depth sensing cameras, weight sensors, touch sensors, tactile output devices, olfactory sensors, temperature sensors, humidity sensors, pressure sensors, or combinations thereof. In a particular implementation, the sensors 108 may include cameras that capture images of the illustrated user operating the UI and, in response, the ARFN 102 may provide feedback to the user and/or may cause performance of actions corresponding to the user's selection. For instance, when the ARFN 102 projects a remote control, the ARFN 102 may provide feedback to the user indicating which button(s) a user is in position to select, may identify a user's selection (e.g., a selection to power on the television) and, in response, may operate the television according to identified selection. While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user without reference to a UI projected within the environment 100.

In this example, one of the ARFNs 102 within the environment 100 is shown to project structured light 110. In addition, the ARFN 102 may capture one or more images 112 within the environment 100 for the purpose of identifying distortions in the structured light 110. While FIG. 1 illustrates one ARFN 102 projecting this structured light and imaging the environment 100 to identify the distortions, in some implementations, one or more other ARFNs 102 may additionally or alternatively perform these functions. In either instance, by imaging the environment 100 in this manner, the ARFNs 102 may identify the user's gestures within the environment. Such gestures may be interpreted as instructions or commands to be implemented by the ARFNs 102.

Note that certain embodiments may not involve the projection of structured light. Accordingly, it should be understood that use of structured light is but one example of various techniques that may be used in object recognition of objects, such as a hand, in a scene. For instance, the ARFN 102 may utilize time-of-flight (ToF) sensors or any other type of depth-sensing techniques to aid in identifying objects within the environment 100.

As illustrated, the computing device 104 of the example ARFN 102 includes one or more processors 114, an input/output interface 116, and memory or computer-readable media 118. The processors 114 may be configured to execute instructions, which may be stored in the computer-readable media 118 or in other computer-readable media accessible to the processors 114.

Figure 2:
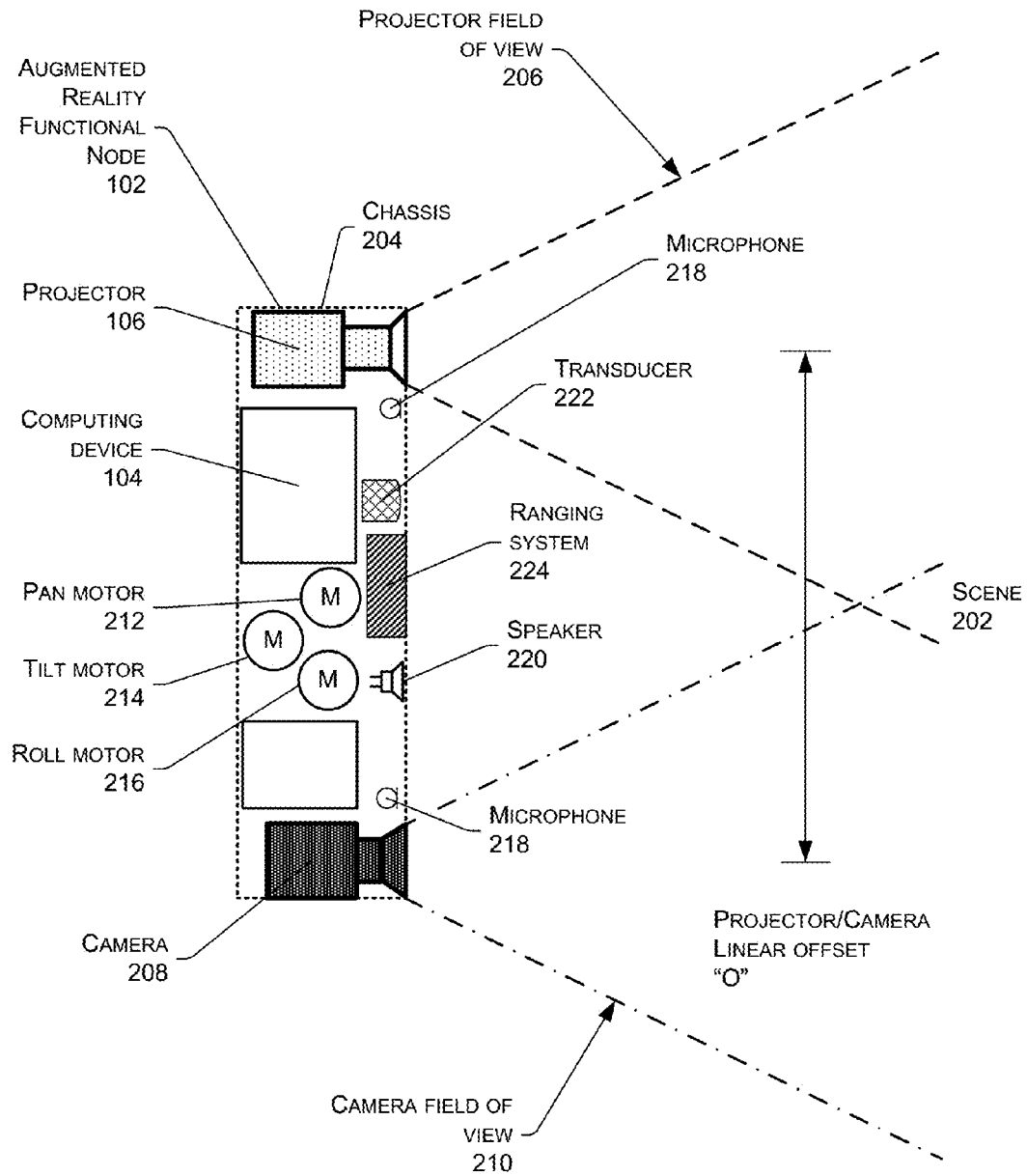
FIG. 2 illustrates an example ARFN that includes a computing device, a projector, a camera, and other selected components for allowing a user to interact with the ARFN with the use of gestures interpreted by the ARFN.

The input/output interface 116, meanwhile, may be configured to couple the computing device 104 to other components of the ARFN 102, such as the projector 106, the sensor 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106, the sensor 108, or both. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN 102, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse images captured by the sensor 108 to identify one or more hands in the environment 100. In response to recognizing a hand and identifying a gesture formed by the hand, the interface module 122 may interpret the gesture and cause the ARFN 102 to perform a corresponding action. For instance, if a user within the environment 100 makes a gesture requesting that the ARFN 102 project a certain piece of content, the interface module 122 may interpret the gesture and cause the projection module 124 to project the content via the projector 106.

The interface module 122 may include an operating object location module 130 to determine the location of an operating object, such as a hand of a user, in the environment 100 in order to obtain input selected via the operating object. As will be described later in more detail, the operating object location module 130 generates 2D contours of 3D objects in the environment 100 and 1D curvature information based on the 2D contours. In some cases, the 2D contours of the operating object and the 2D contours of the display object merge to produce a merged 2D contour when the operating object covers a portion of the display object in order to select a particular input feature of a user interface being projected onto the display object. For example, when a finger of a user moves over the display object to select an input feature of a user interface, the 2D contours of the user's hand and the contours of the display object may form a single contour. In these cases, at least a portion of the 2D contours of the operating object are absent from the merged 2D contour. For example, the ARFN 102 may lose track of the finger of the user as the finger of the user moves over the display object and be unable to generate separate contours for both the finger of the user and the display object. 1D curvature information of the display object and 1D curvature information of the operating object may be analyzed with respect to 1D curvature information of the merged 2D contour to estimate a location of the portion of the 2D contours of the operating object that are absent from the merged contour. 2D information, 3D information, or both related to the operating object may also be used to estimate the location of the portion of operating object that is absent from the merged contour.

The content datastore 126, meanwhile, stores content to be output within the environment 100. For instance, the content datastore 126 may store applications and data for use within the environment 100. The projection module 124 may access the content datastore 126 in order to project requested content within the environment 100. For instance, when a user requests that the ARFN 102 project a particular electronic book, the projection module 124 may access the content datastore 126 to retrieve and cause projection of the desired electronic book.

The computer-readable media 118 may also store the system parameters datastore 128, which is configured to maintain information about the state of the computing device 104, the projector 106, the sensor 108, and so forth. For example, and as described in detail below, the ARFN 102 may be configured to pan and tilt for the purpose of allowing the projector 106 and the sensor 108 to access different projection surfaces in the environment 100. As such, the system parameters maintained in the system parameters datastore 128 may include current pan and tilt settings of the projector 106 and the sensor 108, an indication of content that the ARFN 102 is currently projecting or otherwise outputting, and the like.

The system parameter datastore 128 (or another datastore) may further store a library of reference gestures that may be used to interpret user gestures. As illustrated, the user in the environment 100 may make gestures with his body, such as hand motions, that can be captured by the sensors 108. The computing device 104 may identify motion parameters corresponding to the observed gesture and compare the observed motion parameters to those of the library of reference gestures. The computing device 104 may then classify the observed gesture based on the comparison.

Example ARFN

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. In a particular implementation, the scene 202 may be at least a portion of the environment 100 of FIG. 1. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface, such as a display object, within the scene 202. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector 106. For example, the projector field of view 206 may narrow upon application of an optical zoom to the projector 106.

One or more cameras 208 may also be disposed within the chassis 204. The camera 208 is configured to image the scene in visible light wavelengths, non-visible light wavelengths, or both. The camera 208 has a camera field of view 210 that describes a particular solid angle. The camera field of view 210 may vary according to changes in the configuration of the camera 208. For example, an optical zoom of the camera 208 may narrow the camera field of view 210.

In some implementations, a plurality of cameras 208 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 208. For example, in one implementation the actuator may comprise a pan motor 212, a tilt motor 214, a roll motor 216, and so forth. The pan motor 212 is configured to rotate the chassis 204 in a yawing motion. The tilt motor 214, meanwhile, is configured to change the pitch of the chassis 204. The roll motor 216 is configured to move the chassis 204 in a rolling motion. By panning, tilting, and/or rolling the chassis 204, different views of the scene 202 may be acquired.

One or more microphones 218 may be disposed within the chassis 204, or elsewhere within the scene 202. These microphones 218 may be used to acquire input from a user in the scene 202, may be used to determine the location of a sound, or may be used to otherwise aid in the characterization of and receipt of input from the scene 202. For example, the user may make a particular noise, such as a tap on a wall or a snap of the fingers, which are pre-designated as attention command inputs. The user may alternatively use voice commands. Such audio inputs may be located within the scene 202 using time-of-arrival differences among the microphones 218 and used to summon an active zone within the scene 202.

One or more speakers 220 may also be present to provide for audible output. For example, the speakers 220 may be used to provide output from a text-to-speech module or to playback pre-recorded audio.

A transducer 222 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 224. The ranging system 224 is configured to provide distance information from the ARFN 102 to a scanned object or a set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a projector/camera linear offset designated as "O". This is a linear distance between the projector 106 and the camera 208. Placement of the projector 106 and the camera 208 at a distance "O" from one another may aid in the recovery of 3D structured light data from the scene 202. The known projector/camera linear offset "O" may also be used to calculate distances, dimensioning, and otherwise aid in the characterization of objects within the scene 202. In other implementations the relative angle and size of the projector field of view 206 and camera field of view 210 may vary. Also, the angle of the projector 106 and the camera 208 relative to the chassis 204 may vary.

In other implementations, the components of the ARFN 102 may be distributed in one or more locations within the scene 202. As mentioned above, microphones 218 and speakers 220 may be distributed throughout the environment that includes the ARFN 102. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

3D Analysis Using Structured Light Pattern

Figure 3:
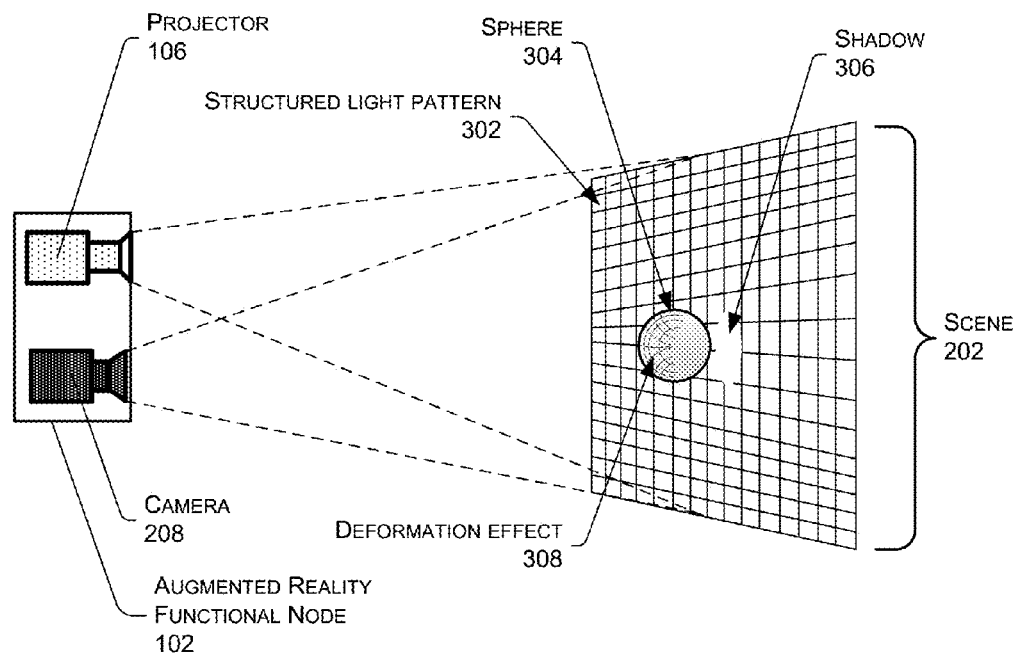
FIG. 3 is an illustrative diagram of the ARFN using structured light to identify surfaces, objects, and user interactions within an environment.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 208 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to a user within the scene 202, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene 202. These may include different PN patterns, geometric shapes, and so forth.

For illustrative purposes, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene 202. Where the projector 106 and camera 208 have differing fields of view, such as shown in FIG. 2, the dispersion or change in the "density" of the structured light pattern 302 may be used to determine depth of field.

The camera 208 may detect the interaction of the structured light pattern 302 with objects within the scene 202. For example, the deformation effect 308 on the sphere 304 may be detected by the camera 208. The camera 208 may similarly identify deformation effects on users within the scene 202 and may utilize this information to identify user gestures and trajectories of these gestures. That is, the camera 208 may identify, via deformation in the structured light, a location of a selection tool (e.g., a user's finger) as this location changes over time. The ARFN 102 may then use these locations tracked over time to identify a trajectory of the gesture.

Detecting Hand Poses

Figure 4:
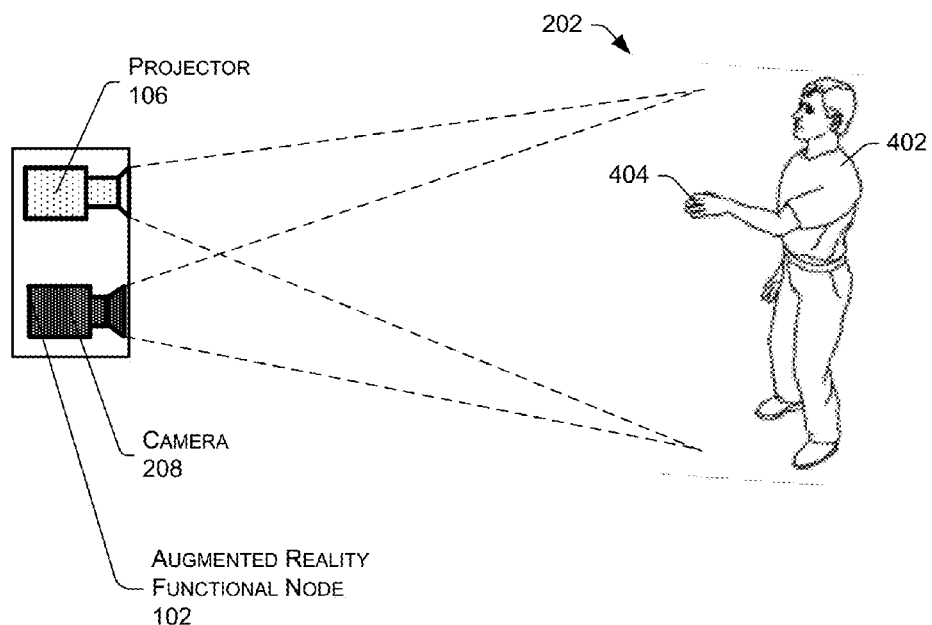
FIG. 4 is an illustrative diagram of the ARFN detecting an object, such as the user's hand, within an environment.

FIG. 4 illustrates an example of how the ARFN 102 may be used to observe and identify hand gestures within the scene 202. FIG. 4 shows a person 402 and the person's hand 404 as examples of objects within the scene 202 that may be analyzed by the ARFN 102.

In order to identify hand gestures, the ARFN 102 detects and tracks the hand 404 within the scene 202. Specifically, the ARFN 102 may identify a sequence of hand positions or poses that form a hand gesture. A hand gesture may be defined by a series of poses of the hand 404, where each pose indicates the 3D position of the hand 404 and the 3D angular orientation of the hand 404. Position and angular orientation may be evaluated as absolute positions and orientations or as relative positions and orientations.

As an example, 3D position coordinates may be specified relative to orthogonal X, Y, and Z axes. 3D angular orientations may be specified as rotations about the X, Y, and Z axes.

As described herein, the camera 208 may be used in conjunction with a structured light pattern projected by the projector 106 to capture 3D information regarding objects within the scene 202. Specifically, the projector 106 may project a structured light pattern onto the scene 202, and the camera 208 may capture a 2D image or array that indicates the resulting reflected light pattern, which is potentially distorted by objects within the scene 202. The reflected light pattern can be analyzed to reconstruct 3D characteristics or models of objects within the environment 100.

In addition to being used to observe a reflected light pattern, as described above, the camera 208 of the ARFN 102 may be used to capture 2D images of the scene 202. For example, the camera 208 may be used in conjunction with ambient lighting, with or without further illumination by the projector 106, to capture a 2D image of the scene 100. The captured 2D image may be a color or grayscale image, comprising an array of pixels defined by tone or color intensities.

As described herein, the projector 106 may be configured to project non-visible light, or light of a specific wavelength that can be filtered by the camera 208 or by electronics associated with the camera 208. This may allow the ARFN 102 to obtain, from a single image capture, a 2D color image of the scene 202 and a 2D pattern image of the projected light pattern as reflected by any objects within the scene 202, such as the person 402 and/or the person's hand 404.

Note that certain embodiments may implement 3D shape detection, analysis, and reconstruction using techniques that do not involve the projection and/or analysis of structured light. Accordingly, it should be understood that structured light analysis is described as but one example of various 3D analysis techniques that may be used to identify 3D shapes within a scene or within regions of a scene.

Object (e.g., Hand) Tracking

Described below are techniques of using a projection and imaging system (e.g., an ARFN 102) to determine the location of particular objects or portions of object in a sequence of images, such as images including a display object and an operating object. In certain implementations, the display object is an open hand and the operating object is a hand with a pointing finger extended as a stylus. The various processes described below with reference to FIGS. 5 and 11 may be implemented by the architectures described herein, or by other architectures. Each process is illustrated as a collection of blocks in a logical flow graph. Some of the blocks represent operations that can be implemented in hardware, software, or a combination thereof. In an illustrative example, the operations may be implemented via one or more of the modules 120, 122, 124, and 130 of the ARFN 102 of FIG. 1. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 5:
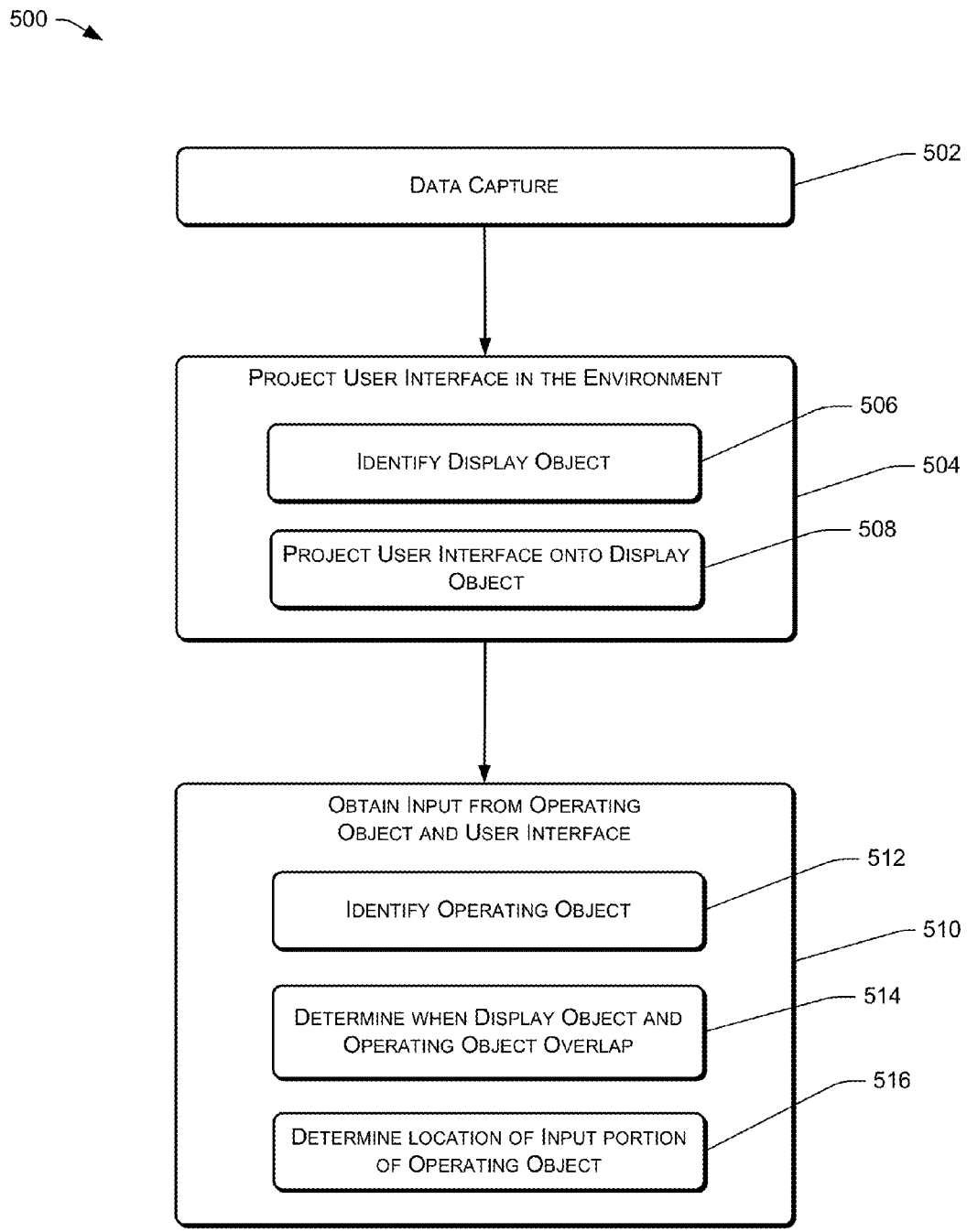
FIG. 5 illustrates an example flow diagram of a process to analyze or monitor an environment to determine a location of a portion of an operating object when covering a portion of a display object.

FIG. 5 illustrates an example flow diagram of a process 500 to analyze or monitor an environment to determine a location of a portion of an operating object when covering a portion of a display object. By determining the location of the operating object, input features of a user interface projected onto the display object that are being selected by a user can be identified. In this way, input selected by a user may accurately be communicated to the ARFN 102. The process 500 will be described as being performed in the environment described above with reference to FIGS. 1-4. However, the process 500 may be performed in other environments, using other means of image capture and/or scene analysis.

At 502, data is captured by one or more of the sensors 108 of the ARFN 102. For example, a plurality of images of a scene 202 within the environment 100 may be obtained via the cameras 208. In one implementation, the images may include a series of 3D images captured over time. In some cases, the data captured by the one or more sensors 108 may also include 2D images. In particular situations, the 2D images captured by the one or more sensors 108 may correspond to respective 3D images captured by the one or more sensors 108. Additionally, data may be captured by the sensors 108 by detecting the interaction between the structured light pattern 302 and one or more objects within the scene 202, such as one or more hands 404 of the user 402.

At 504, a user interface may be projected in the environment 100. In some cases, the user interface may be projected in the environment 100 in response to a command received by the ARFN 102 from a user or a device actuated by the user. For example, at 506, the ARFN 102 may identify a display object in the environment 100. In some cases, the display object may include a surface onto which a user interface being projected by the ARFN 102 may be viewed. In one implementation, the surface may be substantially planar, while in other situations, the surface may be irregular. In a non-limiting illustrative example, the display object may be a hand of a user in the environment 100. The hand of the user may include a palm portion, one or more finger portions, a wrist portion, a thumb portion, or a combination thereof.

In one implementation, the display object may be identified by determining 2D contours of at least one object in images of the environment 100 and comparing the 2D contours of objects in the image with a reference group of display object contours. In a particular implementation, 2D contours of objects may be determined by segmenting surfaces within the environment 100 to identify different continuous surfaces within 3D images of the environment 100. In some instances, the segmentation of the 3D images of the environment 100 may produce 3D data sets corresponding to each respective continuous surface. In an illustrative implementation, continuous surfaces within the environment 100 may be identified by determining distances between particular points in the environment 100 and the sensor 108. When the difference between respective distances between two points within the environment 100 and the sensor 108 is less than or equal to a threshold distance, the two points are designated as being part of the same continuous surface.

In a particular implementation, 3D boundaries of the continuous surfaces may then be determined. The 3D boundaries of the continuous surfaces may include 3D points located on the outermost edges or the periphery of the continuous surfaces in the environment 100. Subsequently, 2D contours of the continuous surfaces may be generated from the 3D boundaries. In some cases, the 2D contours of particular objects included in the 3D images of the environment 100 may be determined, such as the 2D contours of one or more hands located within the environment.

In another implementation, the display object may be identified by determining a number of peak points of at least one object in the environment 100. A peak point of an object may be identified when the 1D curvature of the object is at a local maximum (i.e., signifying a change in direction) and the distance between points along the periphery of the object is at a local minimum (i.e. signifying that the points are close together). In some cases, where the at least one object is a hand, the peak points may correspond to one or more fingers of the hand and a thumb of the hand. In implementations where the display object is a hand facing up, the display object may be identified when the number of peak points of an object is five, corresponding to each of the fingers and the thumb of the hand.

Once a display object within the environment 100 is identified, at 508, a user interface is projected onto the display object. In a particular implementation, the projector 106 of the ARFN 102 may project the user interface onto the display object. The user interface may include one or more input devices that include one or more input features that are selectable to indicate a respective input to the ARFN 102. For example, the one or more input devices may include a keyboard, a pointing device (e.g., a mouse), a telephone keypad, a game controller, another device with a number of input features, or a combination thereof. In implementations where the display object is a hand, the user interface may be projected onto the hand. For instance, a telephone keypad may be projected onto the palm of the hand. This scenario is described below in more detail with reference to FIGS. 9 and 10.

In an implementation, the locations of respective input features of the user interface may be determined based, at least in part, on images captured by the camera 208. In some cases, 2D information, 3D information, or both captured by the camera 208 may be utilized to determine the locations of the input features of the user interface. In a particular implementation, RGB images of the environment 100 may be used to identify differing shapes and/or colors of the input features to identify respective input features. In other situations, the projection module 124 may generate the location of the input features of the user interface based, at least in part, on the location of the display object. Thus, as the location of the display object changes, the projection module 124 may adjust the projector 106 such that the input features of the user interface are displayed on a particular portion of the display object even as the display object moves. Additionally, the location of the input features may be expressed as coordinates in a 3D coordinate system. For example, each input feature may be associated with one or more X-axis coordinates, one or more Y-axis coordinates, and one or more Z-axis coordinates.

At 510, input may be obtained via an operating object and user interface in the environment 100. For example, at 512, an operating object may be identified. In various examples, the operating object may include a hand of a user in the environment 100, a stylus, or another type of pointer device. Additionally, the operating object may include an input portion, such as an index finger of a hand or a tip of a stylus, that may indicate an input feature of a user interface being selected.

In one implementation, the operating object may be identified by comparing 2D contours of at least one object in 3D images with a reference group of operating object contours. In another implementation, the operating object may be identified by determining a number of peak points of at least one object in a number of 3D images captured of the environment 100. To illustrate, the operating object may be characterized by a single peak point corresponding to the index finger of a hand segment of a user being utilized to select input features of the user interface, since the rest of the fingers of the hand segment may be pointed inward toward the palm and not be characterized by respective peak points.

At 514, the ARFN 102 may determine when a portion of the operating object overlaps with a portion of the display object. Thus, as the operating object and display object approach each other and overlap, the respective contours of the operating object and the display object may partially merge to produce a merged contour. In some cases, the portion of the operating object that overlaps with the portion of the display object may include the input portion of the operating object. In one example, when the index finger of a hand or the tip of a stylus moves over or touches the display object to select an input feature of the user interface, the 2D contours of the a display object and 2D contours of an operating object may come together to produce a 2D merged contour. One outcome of the merged contour is that the 2D contours of the operating object portion that overlap with the 2D contours of the display object portion may be absent. To illustrate, when the index finger of a user moves over the palm to select an input feature of the user interface being projected thereon, at least a portion of the 2D contours of the index finger may be absent from the merged contour. This will be shown and described in more detail with reference to FIG. 8.

Since the 2D contours of the input portion of the operating object may be absent from the merged contour, the process 500 may include, at 516, determining the location of the input portion of the operating object. This may include, for example, determining the location of the input portion of the operating object. In an implementation, the location of the input portion of the operating object may be used to re-generate the contours of the operating object that are missing from the merged contour. The contours of the operating object that are missing from the merged contour may indicate a location of the input portion of the operating object. In some scenarios, the location of the input portion and/or the missing contours of the operating object may be determined based at least in part on 1D curvature information of the operating object, 1D curvature information of the display object, 1D curvature information of the merged contour, or a combination thereof.

In a particular implementation, 1D curvature information may be determined based at least in part on the 2D contours of the operating object, the 2D contours of the display object, and the 2D merged contour. In some cases, the 1D curvature information may be determined by translating points along the periphery of an object according to a translation function. The translation function may include a rule that graphically captures the 2D curvature of the object.

In an illustrative implementation, 1D curvature information of the display object and the operating object may be generated before the 2D curvatures of the operating object and the display object begin to overlap. Additionally, after the 2D contours of the operating object and the display object overlap, 1D curvature information may be generated from the 2D merged contour. The 1D curvature information of the operating object and the display object generated before the 2D contours overlap may be analyzed with respect to the 1D curvature information of the merged contour to identify a portion of the 1D curvature information of the merged contour that corresponds to the display object and a portion of the 1D curvature information of the merged contour that corresponds to the operating object. Further, the 1D curvature information of the operating object may be analyzed with respect to the 1D curvature information of the merged contour to identify portions of the 1D curvature information of the operating object that are absent from the 1D curvature information of the merged contour. In this way, the 1D curvature information of the operating object that is absent from the 1D curvature information of the merged contour may be used to generate a 2D contour of the operating object that is absent from the merged contour. Accordingly, the location of the input portion of the operating object may be determined by identifying the 1D curvature information of the operating object that is absent from the 1D curvature information of the merged contour and generating the remaining portion of the 2D contours of the operating object with respect to the merged contour.

In some situations, the location of the input portion of the operating object may be determined by calculating a distance between one or more points on the outer periphery of the input portion and one or more additional points on the operating object. In a situation where the input portion of the operating object is a finger, the distance between a peak point on the finger and one or more points on the palm of the hand may be determined. The distance may be utilized in conjunction with the 1D curvature information of the operating object, the 1D curvature information of the display object, the 1D curvature information of the merged contour, the 2D contours of the operating object, the 2D contours of the display object, and/or the 2D merged contour to determine the location of the input portion of the operating object. To illustrate, when a point on the palm of the hand segment can be identified by the 1D curvature information and/or the 2D contours of the operating object, the distance between the peak point and the point on the palm may be utilized to determine the location of the finger with respect to the merged contour using an extrapolation technique. This is shown and discussed in more detail below with reference to FIG. 9.

Furthermore, 2D information, 3D information, or both may be utilized to determine the location of the contours of the input portion of the operating object by determining the length of the input portion of the operating object, such as the length of a finger. For example, the length of the input portion of the operating object may be determined from 2D information, 3D information, or both obtained from previous images including the operating object. Accordingly, the 1D curvature information, the 2D contours, or both of the operating object, the display object, and/or the merged contour may be utilized to determine an amount of the input portion that is absent from the merged contour and the length of the input portion may be utilized to determine the location of the input portion that is missing. In one illustrative implementation, 2D information of the operating object may be utilized to determine a number of pixels associated with the operating object that are missing from the merged contour. In this situation, the length of the operating object that is absent may be determined based, at least in part, on the number of pixels absent from the merged contour and the location of the input portion of the operating object may be estimated. In another illustrative implementation, the 3D depth information may be utilized to directly determine the length of the operating object that is absent from the merged contour and estimate the location of the input portion of the operating object.

After determining a location of the input portion of the operating object, the location of the input portion may be compared with the location of the input features of the user interface to determine a particular input feature being indicated by the input portion of the operating object. For example, the location of the input portion of the operating portion may be expressed as coordinates in a 3D coordinate system. In this situation, the coordinates corresponding to the location of the input portion of the operating object may be compared with the coordinates of the respective input features of the user interface to determine the particular input feature being selected using the input portion.

Figure 6:
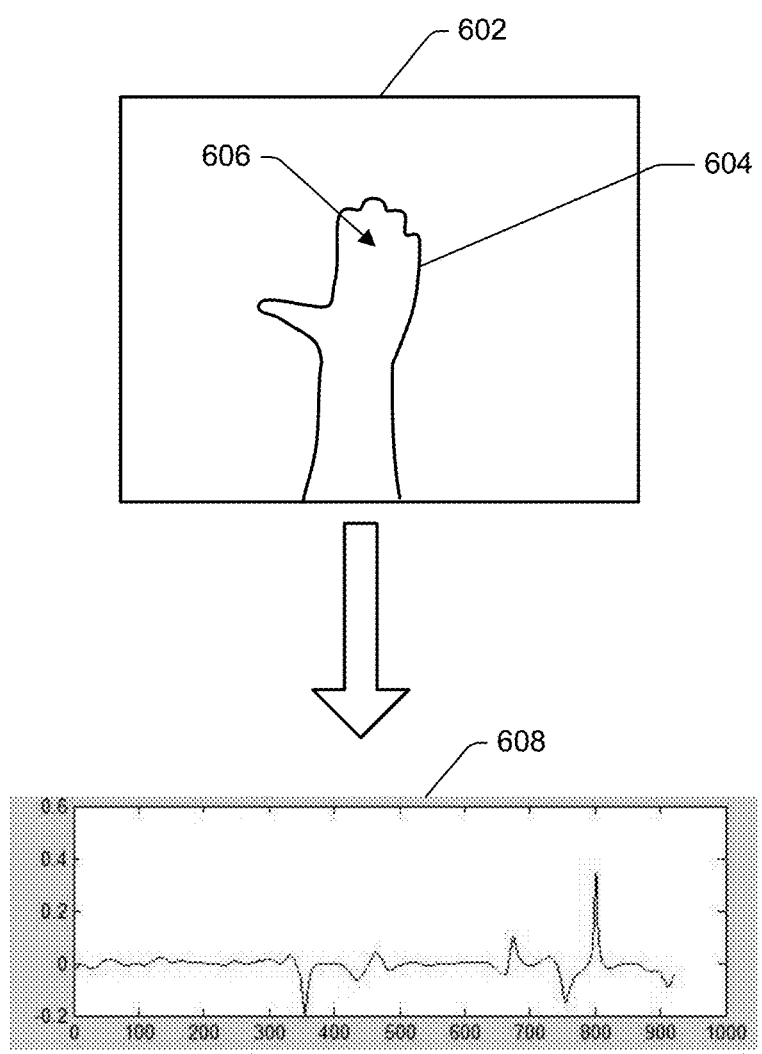
FIG. 6 illustrates a first example of a 2-Dimensional (2D) image of contours of a display object and 1-Dimensional (1D) curvature information corresponding to the 2D contours of the display object.

FIG. 6 illustrates a first example of a 2-Dimensional (2D) image 602 of contours 604 of a display object 606 and 1-Dimensional (1D) curvature information 608 corresponding to the 2D contours 604 of the display object 606. In the illustrative example of FIG. 6, the operating object 606 is a left hand of a user with palms up, fingers touching each other, and the thumb projecting to the side. The associated 1D curvature information 608 is formed by measuring points along the periphery of the hand segment 606.

Figure 7:
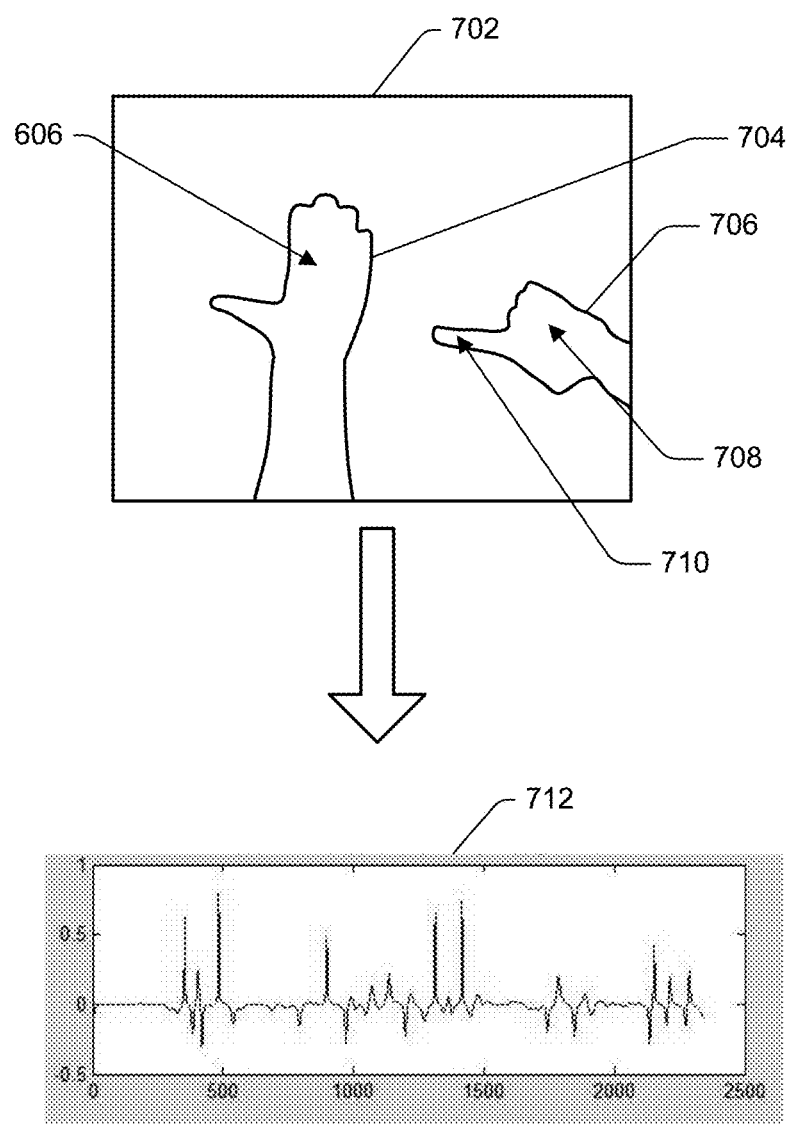
FIG. 7 illustrates a second example of a 2D image of contours of a display object and contours of an operating object.

FIG. 7 illustrates a second example of a 2D image 702 of contours 704 of a display object 606 that may be taken subsequent to the 2D image 602 in FIG. 6. In this image, contours 706 of an operating object 708 have appeared from the right of the image 702. In the illustrative example of FIG. 7, the operating object 708 may be a right hand segment of a user. The operating object 708 may also include an input portion 710, which is an index finger in the illustrative example of FIG. 7. FIG. 7 also illustrates respective 1D curvature information 712 corresponding to the 2D contours 706 of the operating object 708. As above, this graph 712 is formed by measuring points along the periphery of the operating object 708.

Figure 8:
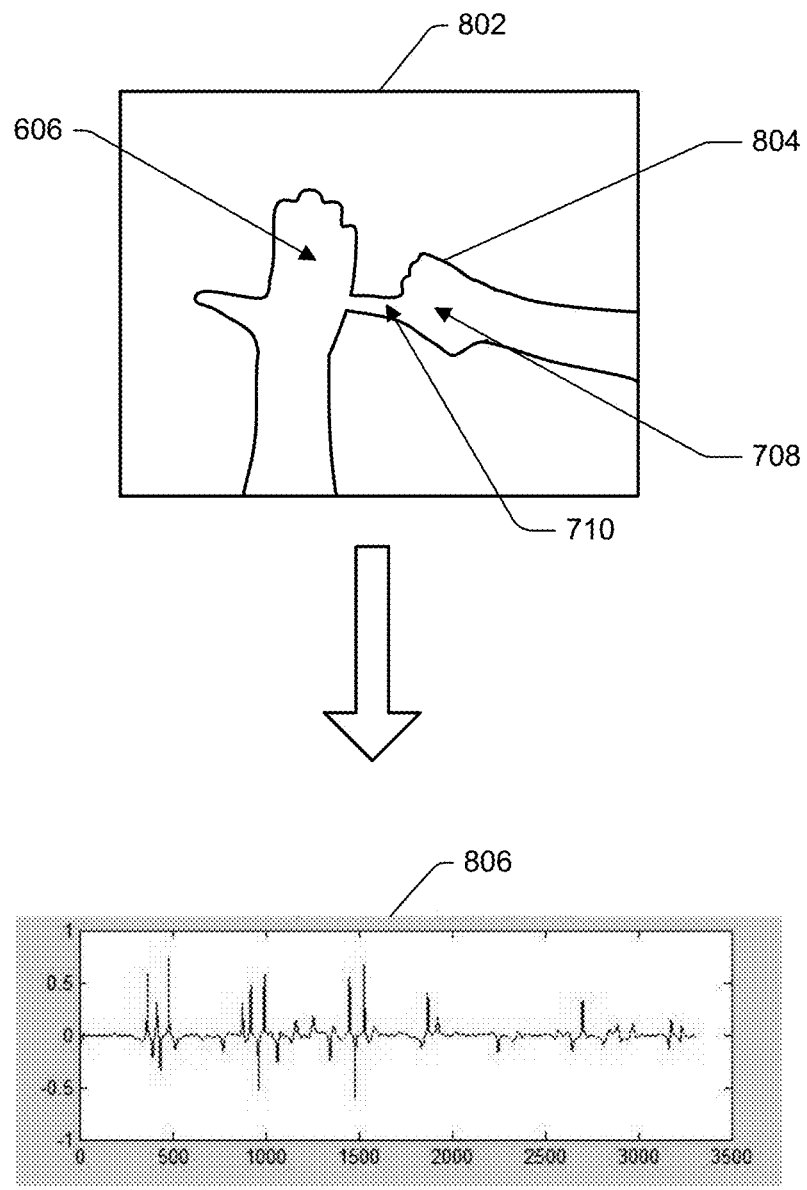
FIG. 8 illustrates a third example of a 2D image of a merged contour that includes a portion of the contours of an operating object and a portion of the contours of a display object, where a particular portion of the contours of the operating object are absent from the merged contour.

FIG. 8 illustrates a third example of a 2D image 802 taken subsequent to the image 702 of FIG. 7. In this image, a merged contour 804 is formed that includes a portion of the contours of an operating object 708 and a portion of the contours of a display object 606. Notice that a particular portion of the contours of the operating object 708 are absent from the merged contour 804. In particular, a portion of the input portion 710 of the operating object 708 (i.e., the tip of the index finger) is absent from the merged contour 804. In some cases, the merged contour 804 may be generated when the input portion 810 overlaps with the display object 606. Additionally, portions of the input portion 710 may be absent from the merged contour 804 when a distance between the input portion 710 and a portion of the display object 606 is less than a specified distance. For example, portions of the input portion 710 that are touching the display object 606 may be absent from the merged contour 804. In another example, a particular portion of the input portion 710 may be absent from the merged contour when the particular portion of the input portion 710 is within a specified distance of the display object 606, such that the ARFN 102 is unable to identify separate continuous surfaces for the display object 606 and the particular portion of the input portion 710. FIG. 8 also illustrates 1D curvature information 806 of the merged contour.

Figure 9:
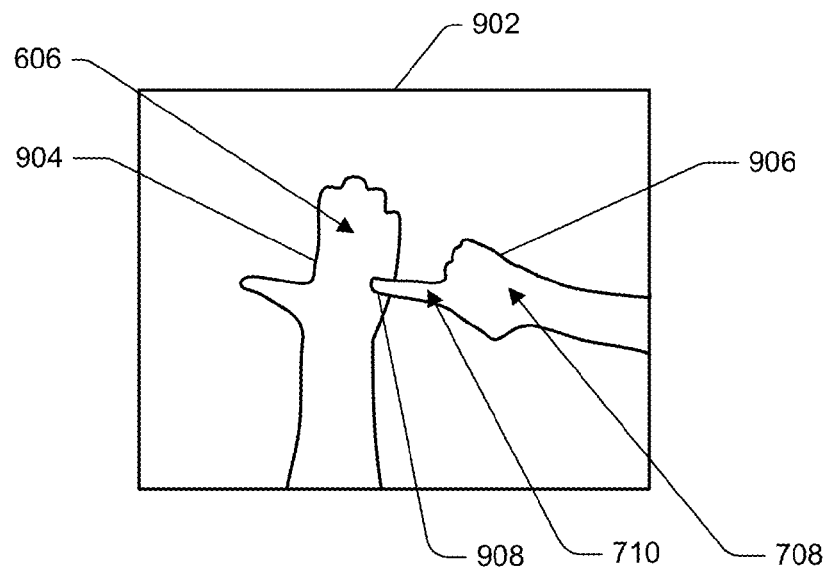
FIG. 9 illustrates a fourth example of a 2D image of contours of the display object and contours of the operating object including the contours of the operating object that are absent from the merged contour of FIG. 8.

FIG. 9 illustrates a fourth example of a 2D image 902 that is essentially identical to the image 802 of FIG. 8, in that it includes contours 904 of the display object 606 and contours 906 of the operating object 708. But, unlike image 802, the 2D image 902 further includes contours 908 of the operating object 708 that are absent from the merged contour 804 of FIG. 8. In particular, the 2D contours 908 include at least a portion of the contours 906 of the input portion 710. The portions of the 2D contours 908 of the input portion 710 that were absent from the merged contour 804 may be determined by analyzing the 1D curvature information 806 of the merged contour 804 with respect to the 1D curvature information 712 of the operating object 708. The portions of the 2D contours of the input portion 908 that were absent from the merged contour 804 may also be determined based, at least in part, on 2D information and/or 3D information associated with the operating object 708 and the display object 606 obtained from previously captured images including the operating object 708 and the display object 606.

Figure 10:
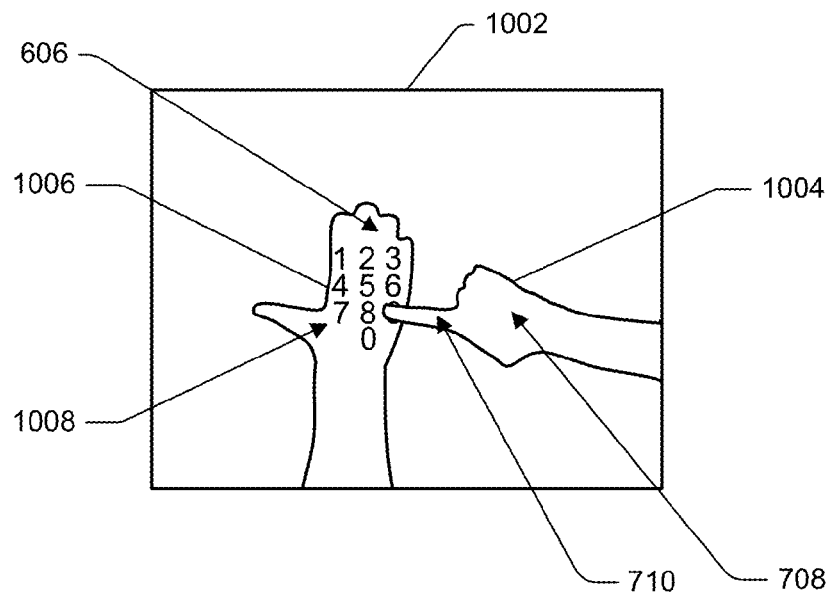
FIG. 10 illustrates a fifth example of a 2D image of contours of the display object and contours of the operating object and projecting a user interface onto a portion of the display object.

FIG. 10 illustrates a fifth example of a 2D image 1002, which is similar to the image 902 of FIG. 9 in that contours 1004 of the entire operating object 708 and contours 1006 of the display object 606 are depicted. In addition, however, a user interface 1008 is projected onto a portion of the display object 606. In the illustrative example of FIG. 10, the user interface 1008 includes a keypad of a telephone and the input portion 710 of the operating object 708 is being used to select the number "9" of the user interface 1008. Upon determining the location of the input portion 710 with respect to the user interface 1008, data indicating that a user has selected the number "9" on the telephone keypad may be generated at the ARFN 102.

Figure 11:
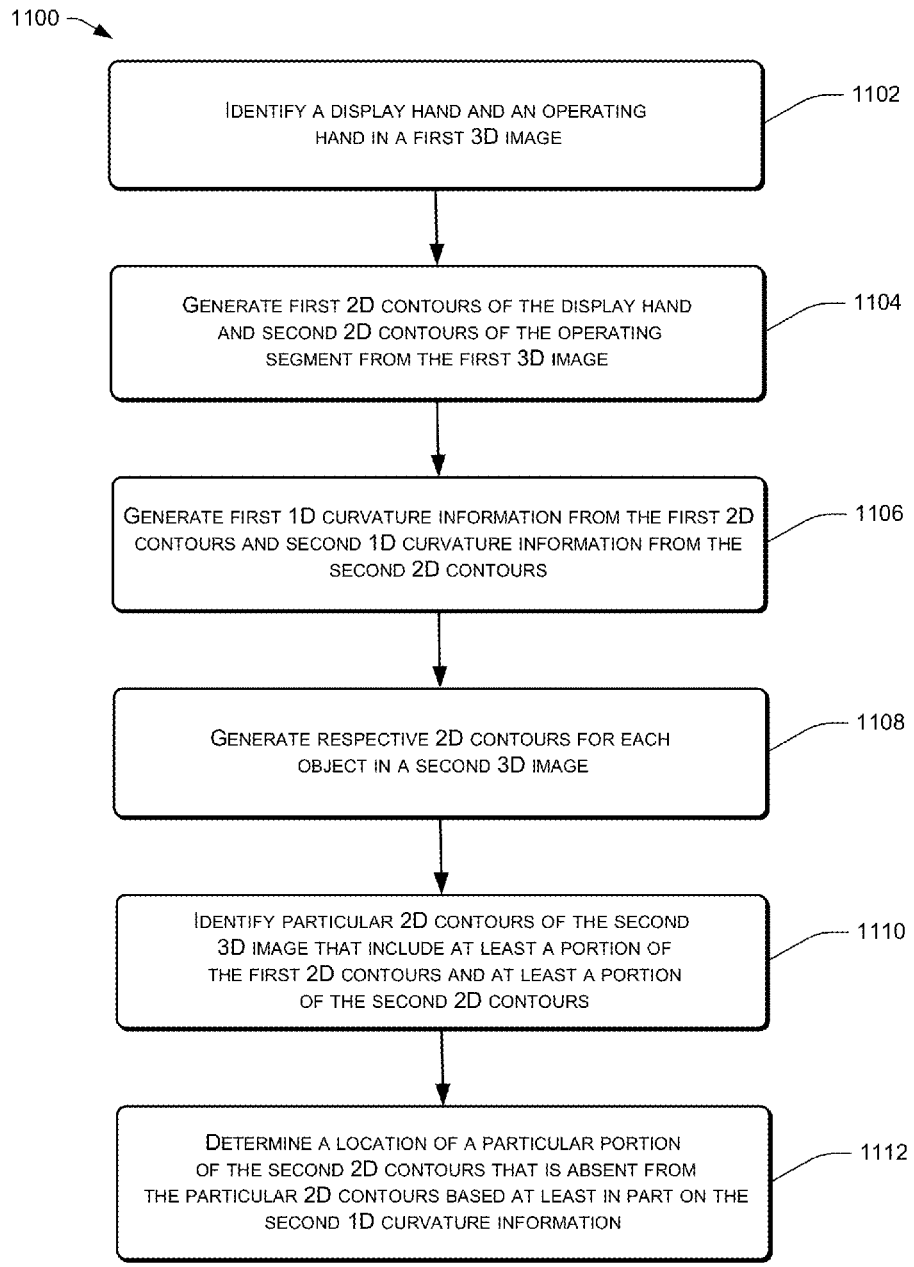
FIG. 11 shows an example flow diagram of a process to determine a location of a portion of an operating object having contours that overlap with contours of a display object.

FIG. 11 shows an example flow diagram of a process 1100 to determine a location of a portion of an operating object having contours that overlap with contours of a display object. The process 1100 will be described as being performed in the environment 100 described previously herein, but may be performed in other environments, using other means of image capture and/or scene analysis. The process 1100 may be used to determine a location of a portion of an operating object that is absent from a merged 2D contour, whereby the merged 2D contour includes a portion of 2D contours of a display object and a portion of 2D contours of the operating object.

At 1102, the process 1100 includes identifying a display hand and an operating hand in a first 3D image. In some cases, the first 3D image may be obtained via the one or more sensors 108 of the environment 100. A user interface may be projected onto the display hand and the operating hand may be used to select input features of the user interface.

At 1104, the process 1100 includes generating first 2D contours of the display hand and second 2D contours of the operating hand from the first 3D image. The 2D contours of the operating hand and the display hand may reveal an approximate outline of the operating hand and the display hand. The first 2D contours may be generated by determining a first continuous surface in the first 3D image that corresponds to the display hand. The first continuous surface may be determined using segmentation techniques. The segmentation techniques may include one or more shape analysis techniques, including 2D and/or 3D techniques to identify objects within the environment 100 that are separated from each other.

Additionally, 3D boundaries of the first continuous surface may be determined and 2D contours of the display hand may be generated based at least in part on the 3D boundaries of the display hand. The second 2D contours of the operating hand may be generated by determining a second continuous surface of the first 3D image corresponding to the operating hand and determining 3D boundaries of the second continuous surface. The second 2D contours of the operating hand may be generated based at least in part on the 3D boundaries of the operating hand. In some cases, a 2D Gaussian smoothing filter may be applied to generate at least one of the first 2D contours of the display hand or the second 2D contours of the operating hand.

At 1106, the process 1100 includes generating first 1D curvature information form the first 2D contours of the display hand and second 1D curvature information from the second 2D contours of the operating hand. The 1D curvature information may be generated by applying a translation function that captures the curvature of the operating hand and the display hand from their respective 2D contours. In one example, the translation function may express the 2D contours in terms of direction changes along the periphery of the object. In some cases, the translation function may be applied such that leftward movement along the periphery of the object is represented as a positive value in the 1D curvature information for the object and rightward movement along the periphery of the object is represented as a negative value in the 1D curvature information for the object. In other cases, leftward movement along the periphery of the object is represented as a negative value in the 1D curvature information for the object and rightward movement along the periphery of the object is represented as a positive value in the 1D curvature information for the object. In another example, the translation function may be applied in regard to vertical direction along the periphery of the object. In some instances, upward movement along the periphery of the object may be represented as a positive value and downward movement may be represented as a negative value, while in other situations, upward movement along the periphery of the object may be represented as a negative value and downward movement may be represented as a positive value.

At 1110, the process 1100 includes generating contours for each object in a second 3D image. In an implementation, the contours of the objects in the second 3D image may be determined by identifying continuous surfaces of the second 3D image using techniques similar to those described previously with respect to 1104 and FIG. 5. 2D contours for each continuous surface of the second 3D image may then be generated. Each continuous surface in the second 3D image may be associated with one or more objects.

At 1110, the process 1100 includes identifying particular 2D contours of the second 3D image that include at least a portion of the first 2D contours of the display hand and at least a portion of the second 2D contours of the operating hand. These particular 2D contours may represent a merged contour that is produced when the display hand and the operating hand overlap. In this situation, at least a portion of the 2D contours of the display hand and at least a portion of the 2D contours of the operating hand may be absent from the merged contour.

At 1112, the process 1100 includes determining a location of a particular portion of the second 2D contours of the operating hand segment that is absent from the 2D merged contour of the second 3D image based, at least in part, on the 1D curvature information generated from the 2D contours of the display object. In one implementation, the particular portion of the 2D contours of the operating hand that is absent from the 2D merged contour may include at least a portion of a finger of the operating hand that is above or touching a portion of the display hand that corresponds to a particular input feature of a user interface being projected onto the display hand. Additionally, the location of the particular portion of the 2D contours of the operating hand that is absent from the 2D merged contour may be determined based, at least in part, on 1D curvature information generated from the merged 2D contour. Further, the location of the particular portion of the 2D contours of the operating hand that is absent from the 2D merged contour may also be determined based, at least in part, on at least one of 2D information or 3D information of the operating hand and/or the display hand from the first image, the second image, or both.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    determining first curvature information associated with a first object;
    determining second curvature information associated with a second object;
    projecting at least a portion of an image onto the first object;
    detecting that a portion of the second object overlaps at least a portion of the first object; and
    determining a location of a selected image portion of the image based at least in part on the first curvature information and the second curvature information.

2. The method of claim 1, wherein the second object is a hand.

3. The method of claim 1, further comprising:
    forming a merged contour from the first curvature information and the second curvature information; and
    wherein determining that the second object overlaps the first object is based at least in part on the merged contour.

4. The method of claim 1, further comprising determining the second object is within a distance threshold of the first object prior to determining the location.

5. The method of claim 1, further comprising applying a Gaussian filter to generate at least one of the first contour information or the second contour information.

6. The method of claim 1, further comprising:
    determining a length of the portion of the second object that overlaps with the portion of the first object; and
    wherein determining the location is based at least in part on the length.

7. A method comprising:
    under control of one or more computer systems configured with executable instructions,
    generating first curvature information related to a display object and second curvature information related to an operating object within a first image projected into an environment;
    determining one or more continuous surfaces in a second image projected into the environment;
    generating contours of surfaces in the second image, the surfaces including at least a portion of the display object and at least a portion of the operating object; and
    determining a location based at least in part on the contours.

8. The method of claim 7, wherein determining the location is based at least in part on the first curvature information and the second curvature information.

9. The method of claim 7, further comprising:
    detecting a first contour within the first image, the contour associated with the display object;
    detecting a second contour within the first image, the contour associated with the display object;
    wherein the first curvature information is determined based at least in part on the first contour; and
    wherein the second curvature information is determined based at least in part on the second contour.

10. The method of claim 7, further comprising determining at least one boundary associated with the display object and the operating object and wherein determining the location is based at least in part on the at least one boundary.

11. The method of claim 7, further comprising performing at least one operation, the at least one operation associated with the location on the display object.

12. The method of claim 7, wherein the second image is a graphical user interface.

13. The method of claim 7, further comprising:
    segmenting the first image to produce contours prior to generating the first curvature information and the second curvature information.

14. A system comprising:
    one or more processors;
    a component for receiving image data;
    one or more computer-readable media storing computer-executable instructions that, when executed by the one or more processors, cause the one or more processors to perform acts comprising:
        generating curvature information of a display object and an operating object based at least in part on image data received from the component, the display object and the operating object associated with a projection area; and determining a location associated with the operating object based at least in part on the curvature information of the display object and the operating object.

15. The system of claim 14, wherein the component for receiving the image data includes a camera.

16. The system of claim 14, further comprising:

a projector for projecting an image into the projection area; and wherein the image data is received by the component while the image is projected into the projection area.

17. The system of claim 14, wherein the one or more computer-readable media stores computer-executable instructions that, when executed by the one or more processors, cause the one or more processors to perform acts comprising determining that the operating object overlaps the display object.

18. The system of claim 14, wherein the one or more computer-readable media stores computer-executable instructions that, when executed by the one or more processors, cause the one or more processors to perform acts comprising:

determining contour information associated with the display object and the operating object based on the image data received from the component; and wherein the curvature information is generated based at least in part on the contour information.

19. The system of claim 14, wherein the one or more computer-readable media stores computer-executable instructions that, when executed by the one or more processors, cause the one or more processors to perform acts comprising determining a distance between the operating object and at least one other object within the projection area.

20. The system of claim 14, wherein generating the curvature information of objects associated with the projection area includes segmenting the image to produce contours.

* * * * *